United States Patent
Wang et al.

(10) Patent No.: US 10,553,014 B2
(45) Date of Patent: Feb. 4, 2020

(54) IMAGE GENERATING METHOD, DEVICE AND COMPUTER EXECUTABLE NON-VOLATILE STORAGE MEDIUM

(71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 44 days.

(21) Appl. No.: 15/741,431

(22) PCT Filed: Jul. 14, 2017

(86) PCT No.: PCT/CN2017/092967
§ 371 (c)(1),
(2) Date: Jan. 2, 2018

(87) PCT Pub. No.: WO2018/072491
PCT Pub. Date: Apr. 26, 2018

(65) Prior Publication Data
US 2018/0374258 A1    Dec. 27, 2018

(30) Foreign Application Priority Data

Oct. 21, 2016 (CN) .......................... 2016 1 0922174

(51) Int. Cl.
*G06T 15/20* (2011.01)
*G06T 15/06* (2011.01)
(Continued)

(52) U.S. Cl.
CPC .............. *G06T 15/20* (2013.01); *G06T 15/06* (2013.01); *G06T 19/20* (2013.01); *H04N 13/122* (2018.05);
(Continued)

(58) Field of Classification Search
None
See application file for complete search history.

(56) References Cited

U.S. PATENT DOCUMENTS

| 6,791,544 B1 | 9/2004 | Hong et al. |
| 2009/0009593 A1 | 1/2009 | Cameron et al. |

(Continued)

FOREIGN PATENT DOCUMENTS

| CN | 101558655 A | 10/2009 |
| CN | 102063735 A | 5/2011 |

(Continued)

OTHER PUBLICATIONS

Stephen J. Adelson, Larry F. Hodges, "Stereoscopic ray-tracing", Mar. 1993, Springer-Verlag, The Visual Computer, vol. 10, issue 3, pp. 127-144.*

(Continued)

*Primary Examiner* — Robert Bader
(74) *Attorney, Agent, or Firm* — Collard & Roe, P.C.

(57) ABSTRACT

An image generating method, includes: establishing a 3D scene model that includes a virtual 3D object, a virtual display screen and at least one sight point set; determining a plurality of intersection points between a plurality of virtual light paths from each sight point to a plurality of virtual object points on the surface of the virtual three dimensional object and the virtual display screen, all virtual light paths $\{l_k^1, l_k^2, \ldots, l_k^S\}$ corresponding to the virtual object point $T_k$ intersect at the virtual object point $T_k$; wherein, $1 \le k \le n$, $1 \le i \le S$, S is the total number of established sight points, and the plurality of virtual object points are all located within the viewing angle range of the virtual display screen; forming S frames of rendered images, including:

(Continued)

determining color parameters of a plurality of intersection points on the virtual display screen to obtain the $i^{th}$ rendered image.

20 Claims, 4 Drawing Sheets

(51) Int. Cl.
  *G06T 19/20* (2011.01)
  *H04N 13/122* (2018.01)
  *H04N 13/30* (2018.01)
  *H04N 13/275* (2018.01)
(52) U.S. Cl.
  CPC .......... *H04N 13/275* (2018.05); *H04N 13/30* (2018.05); *G06T 2219/2012* (2013.01); *G06T 2219/2016* (2013.01)

(56) References Cited

U.S. PATENT DOCUMENTS

| | | |
|---|---|---|
| 2014/0300602 A1 | 10/2014 | Nam et al. |
| 2016/0217602 A1 | 7/2016 | Jiao et al. |

FOREIGN PATENT DOCUMENTS

| | | |
|---|---|---|
| CN | 103957400 A | 7/2014 |
| CN | 104104936 A | 10/2014 |
| CN | 104427325 A | 3/2015 |
| CN | 105204618 A | 12/2015 |
| CN | 105721855 A | 6/2016 |
| CN | 106412556 A | 2/2017 |

OTHER PUBLICATIONS

Timo Aila, Samuli Laine, "Alias-Free Shadow Maps", Jun. 23, 2004, Eurographics Association, EGSR'04 Proceedings of the Fifteenth Eurographics conference on Rendering Techniques, pp. 161-166.*

Hamilton Yu-Ik Chong, "Real-Time Perspective Optimal Shadow Maps", Apr. 8, 2003, Harvard College, Thesis.*

Tomasz Mazuryk, Dieter Schmalstieg, Michael Gervautz, "Zoom Rendering: Improving 3-D Rendering Performance With 2-D Operations", 1995, CG, Institute of Computer Graphics, Vienna University of Technology, Technical Report.*

Krzysztof Dudkiewicz, "Real-Time Depth of Field Algorithm", 1995, Springer, In: Paker Y., Wilbur S. (eds) Image Processing for Broadcast and Video Production. Workshops in Computing.*

William T. Reeves, David H. Salesin, Robert L. Cook, "Rendering Antialiased Shadows with Depth Maps", Jul. 1987, ACM, Computer Graphics, vol. 21, No. 4, pp. 283-291.*

Marc Levoy, Pat Hanrahan, "Light Field Rendering", 1996, ACM, SIGGRAPH '96 Proceedings of the 23rd annual conference on Computer graphics and interactive techniques, pp. 31-42.*

International Search Report of PCT/CN2017/092967 in Chinese, dated Aug. 30, 2017 with English translation.

Notice of Transmittal of the International Search Report of PCT/CN2017/092967 in Chinese, dated Aug. 30, 2017.

Written Opinion of the International Searching Authority of PCT/CN2017/092967 in Chinese, dated Aug. 30, 2017 with English translation.

Chinese Office Action in Chinese Application No. 201610922174.2, dated Sep. 4, 2017 with English translation.

\* cited by examiner

IMAGE GENERATING METHOD, DEVICE AND COMPUTER EXECUTABLE NON-VOLATILE STORAGE MEDIUM

CROSS REFERENCE TO RELATED APPLICATIONS

This application is the National Stage of PCT/CN2017/092967 filed on Jul. 14, 2017, which claims priority under 35 U.S.C. § 119 of Chinese Application No. 201610922174.2 filed on Oct. 21, 2016, the disclosure of which is incorporated by reference.

TECHNICAL FIELD

Embodiments of the present disclosure relate to an image generating method, device and a computer-readable non-volatile storage medium.

BACKGROUND

With the advancement of technology, image display is no longer limited to screen plane of two-dimensional (2D) space, and three-dimensional (3D) picture display is applied more and more in people's daily work, study and entertainment.

In the real world, as shown in FIG. 1a, when normal eyes view an object O, the aggregation distance L of sight lines of two eyes equals to the focusing distance L' of an individual eye, that is, both focusing positions are located on the viewed object O. However, in the present parallactic 3D world, as shown in FIG. 1b, since the screen provides only a binocular parallactic picture of the viewed light field but the respective light direction information required for single eye focusing, the focusing positions of individual eyes are always located at the screen while two eyes are converged to a virtual object outside of the screen due to the parallactic. That is, in the parallactic 3D world, the sight line aggregating distance L of two eyes does not equal to the focusing distance L' of individual eyes, which in turn causes dizziness and discomfort while viewing 3D pictures with eyes.

SUMMARY

Embodiments of the present disclosure provide an image generating method and a device. The rendered images obtained by this image generating method, while being applied to display, enable the focusing distance of a single eye to be consistent with the aggregating distance of two eyes.

In order to achieve the above-mentioned purpose, embodiments of the present disclosure adopt the following technical proposals.

One aspect of the embodiments of this disclosure provides an image generating method, comprising: establishing a three dimensional scene model that comprises a virtual three-dimensional object, a virtual display screen, at least one sight point sets each including at least two points of sight located on a same virtual pupil and in which different sight point sets correspond to different virtual pupils; determining a plurality of intersection points $\{X_1^i, X_2^i, \ldots, X_n^i\}$ between a plurality of virtual light paths $\{l_1^i, l_2^i, \ldots, l_n^i\}$ from each sight point $M_i$, to a plurality of virtual object points $\{T_1, T_2, \ldots, T_n\}$ on the surface of the virtual three dimensional object and the virtual display screen, all virtual light paths $\{l_k^1, l_k^2, \ldots, l_k^S\}$ corresponding to the virtual object point $T_k$ intersect at the virtual object point $T_k$; wherein, $1 \leq k \leq n$, $1 \leq i \leq S$, S is the total number of established sight points, and the plurality of virtual object points $\{T_1, T_2, \ldots, T_n\}$ are all located within the viewing angle range of the virtual display screen; forming S frames of rendered images, including: determining color parameters of a plurality of intersection points $\{X_1^i, X_2^i, \ldots, X_n^i\}$ on the virtual display screen according to the color parameters of the plurality of virtual object points $\{T_1, T_2, \ldots, T_n\}$ to obtain the $i^{th}$ rendered image.

For example, each of the sight point sets includes one emitting sight point and one backtracking sight point; the determining the plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to the plurality of virtual object points $\{T_1, T_2, \ldots, T_n\}$ on the surface of the virtual 3D object and the virtual display screen, all virtual light paths $\{l_k^1, l_k^2, \ldots, l_k^S\}$ corresponding to the virtual object point $T_k$ intersect at the virtual object point $T_k$ includes: simulating a plurality of first light rays emitted from the emitting sight point to the surface of the virtual three-dimensional object via the virtual display screen in a viewing angle range of the virtual display screen to obtain first intersection points between the plurality of first light rays and the virtual display screen, intersection points between the first rays and the surface of the virtual three-dimensional object being virtual object points $\{T_1, T_2, \ldots, T_n\}$; simulating emitting second light rays from the plurality of virtual object points $\{T_1, T_2, \ldots, T_n\}$ to the backtracking sight point to obtain second intersection points between the plurality of the second light rays and the virtual display screen.

For example, the simulating a plurality of first light rays emitted from the emitting sight point to the surface of the virtual three-dimensional object via the virtual display screen in the viewing angle range of the virtual display screen comprises: simulating a plurality of first rays emitted uniformly from the emitting sight point towards the surface of the virtual three-dimensional object in the viewing angle range of the virtual display screen.

For example, the determining color parameters of a plurality of intersection points $\{X_1^i, X_2^i, \ldots, X_n^i\}$ on the virtual display screen according to color parameters of the plurality of virtual object points $\{T_1, T_2, \ldots, T_n\}$ comprises: determining color parameters of the plurality of intersection points $\{X_1^i, X_2^i, \ldots, X_n^i\}$ on the virtual display screen as color parameters of the plurality of virtual object points $\{T_1, T_2, \ldots, T_n\}$; or calculating color parameters of the plurality of intersection points $\{X_1^i, X_2^i, \ldots, X_n^i\}$ on the virtual display screen according to at least one parameter of angles between the plurality of virtual light paths $\{l_1^i, l_2^i, \ldots, l_n^i\}$ and the normal line of the virtual display screen, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object is located and the material of the surface of the virtual 3D object, and color parameters of the virtual object points $\{T_1, T_2, \ldots, T_n\}$.

For example, the forming S frames of rendered images further comprises: adjusting the resolution of the $i^{th}$ frame of rendered image to be consistent with the resolution of the virtual display screen using interpolation method.

Another aspect of the embodiments of this disclosure A image generating device, comprising: an establishing module configured to establish a three dimensional scene model that comprises a virtual three-dimensional object, a virtual display screen, at least one sight point sets each including of at least two points of sight located on a same virtual pupil and in which different sight point sets correspond to different virtual pupils; a determining module configured to determine a plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to a plurality of virtual object points $\{T_1, T_2, \ldots, T_n\}$ on the surface of the virtual three dimensional object and the virtual display screen, all virtual light paths $\{l_k^1, l_k^2, \ldots, l_k^S\}$ corresponding to the virtual object point $T_k$ intersect at the virtual object point $T_k$; wherein, $1 \le k \le n$, $1 \le i \le S$, S is the total number of established sight points, and the plurality of virtual object points $\{T_1, T_2, \ldots, T_n\}$ are all located within the viewing angle range of the virtual display screen; and an image forming module configured to form S frames of rendered images, including: determining color parameters of a plurality of intersection points $\{X_1^i, X_2^i, \ldots, X_n^i\}$ on the virtual display screen according to the color parameters of the plurality of virtual object points $\{T_1, T_2, \ldots, T_n\}$ to obtain the $i^{th}$ rendered image.

For example, each of the sight point sets includes of one emitting sight point and one backtracking sight point; the determining module comprises: a light ray simulation unit configured to simulating a plurality of first light rays emitted from the emitting sight point to a surface of the virtual three-dimensional object via the virtual display screen in a viewing angle range of the virtual display screen; an intersection point obtaining unit configured to obtain first intersection points between the plurality of first light rays and the virtual display screen, the intersection points between the first light rays and the surface of the virtual three-dimensional object being virtual object points $\{T_1, T_2, \ldots, T_n\}$; the light ray simulation unit being further configured to simulate emitting second light rays from a plurality of the virtual object points $\{T_1, T_2, \ldots, T_n\}$ to the backtracking sight point; the intersection point obtaining unit being further configured to obtain second intersection points between a plurality of the second light rays and the virtual display screen.

For example, the light ray simulation unit is specifically configured to simulate emitting uniformly a plurality of first light rays from the emitting sight point to the surface of the virtual three-dimensional object in the viewing angle range of the virtual display screen.

For example, the image forming module is further configured to determine color parameters of the plurality of intersection points $\{X_1^i, X_2^i, \ldots, X_n^i\}$ on the virtual display screen as color parameters of the plurality of virtual object points $\{T_1, T_2, \ldots, T_n\}$; or calculate color parameters of the plurality of intersection points $\{X_1^i, X_2^i, \ldots, X_n^i\}$ on the virtual display screen according to at least one parameter of angles between the plurality of virtual light paths $\{l_1^i, l_2^i, \ldots, l_n^i\}$ and the normal line of the virtual display screen, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object is located and the material of the surface of the virtual 3D object, and color parameters of the virtual object points $\{T_1, T_2, \ldots, T_n\}$.

For example, the image forming module is further configured to adjust the resolution of the $i^{th}$ frame of rendered image to be consistent with the resolution of the virtual display screen using interpolation method.

According to at least one embodiment of this disclosure, a computer executable non-volatile storage medium is provided, in which program instructions are stored that, while being executed by the computer, cause the computer to: establish a three dimensional scene model that comprises a virtual three-dimensional object, a virtual display screen, at least one sight point sets each including of at least two points of sight located on a same virtual pupil and in which different sight point sets correspond to different virtual pupils; determine a plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to a plurality of virtual object points $\{T_1, T_2, \ldots, T_n\}$ on the surface of the virtual three dimensional object and the virtual display screen, all virtual light paths $\{l_k^1, l_k^2, \ldots, l_k^S\}$ corresponding to the virtual object point $T_k$ intersect at the virtual object point $T_k$; wherein, $1 \le k \le n$, $1 \le i \le S$, S is the total number of established sight points, and the plurality of virtual object points $\{T_1, T_2, \ldots, T_n\}$ are all located within the viewing angle range of the virtual display screen; and form S frames of rendered images, including: determining color parameters of a plurality of intersection points $\{X_1^i, X_2^i, \ldots, X_n^i\}$ on the virtual display screen according to the color parameters of the plurality of virtual object points $\{T_1, T_2, \ldots, T_n\}$ to obtain the $i^{th}$ rendered image.

For example, the storage medium of claim 11, wherein each of the sight point sets includes of one emitting sight point and one backtracking sight point; the determining the plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to the plurality of virtual object points $\{T_1, T_2, \ldots, T_n\}$ on the surface of the virtual 3D object and the virtual display screen, all virtual light paths $\{l_k^1, l_k^2, \ldots, l_k^S\}$ corresponding to the virtual object point $T_k$ intersect at the virtual object point $T_k$ includes: simulating a plurality of first light rays emitted from the emitting sight point to the surface of the virtual three-dimensional object via the virtual display screen in a viewing angle range of the virtual display screen to obtain first intersection points between the plurality of first light rays and the virtual display screen, intersection points between the first rays and the surface of the virtual three-dimensional object being virtual object points $\{T_1, T_2, \ldots, T_n\}$; simulating emitting second light rays from the plurality of virtual object points $\{T_1, T_2, \ldots, T_n\}$ to the backtracking sight point to obtain second intersection points between the plurality of the second light rays and the virtual display screen.

For example, the simulating a plurality of first light rays emitted from the emitting sight point to the surface of the virtual three-dimensional object via the virtual display screen in the viewing angle range of the virtual display screen comprises: simulating a plurality of first rays emitted uniformly from the emitting sight point towards the surface of the virtual three-dimensional object in the viewing angle range of the virtual display screen.

For example, the determining color parameters of a plurality of intersection points $\{X_1^i, X_2^i, \ldots, X_n^i\}$ on the virtual display screen according to color parameters of the plurality of virtual object points $\{T_1, T_2, \ldots, T_n\}$ comprises: determining color parameters of the plurality of intersection points $\{X_1^i, X_2^i, \ldots, X_n^i\}$ on the virtual display screen as color parameters of the plurality of virtual object points $\{T_1, T_2, \ldots, T_n\}$; or calculating color parameters of the plurality of intersection points $\{X_1^i, X_2^i, \ldots, X_n^i\}$ on the virtual display screen according to at least one parameter of angles between the plurality of virtual light paths $\{l_1^i, l_2^i, \ldots, l_n^i\}$ and the normal line of the virtual display screen, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object is located and the material of the surface of the virtual 3D object, and color parameters of the virtual object points $\{T_1, T_2, \ldots, T_n\}$.

For example, the forming S frames of rendered images further comprises: adjusting the resolution of the $i^{th}$ frame of rendered image to be consistent with the resolution of the virtual display screen using interpolation method.

Embodiments of the present disclosure enable the focusing distance of a single eye to be consistent with the aggregating distance of two eyes' sight lines while the rendered images are applied to display.

BRIEF DESCRIPTION OF DRAWINGS

In order to make the embodiments of the disclosure apparent, the drawings related to the embodiments of the disclosure will be described briefly. Apparently, the described embodiments are just a part of the embodiments of the disclosure. For those skilled in the art, he or she can obtain other figure(s) according to these figures, without any inventive work.

REFERENCE NUMERALS

01—virtual three-dimensional object; 02—virtual display screen; 03—sight point set; 10—establishing module; 20—determination module; 30—image forming module.

DETAILED DESCRIPTION

The technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1A:
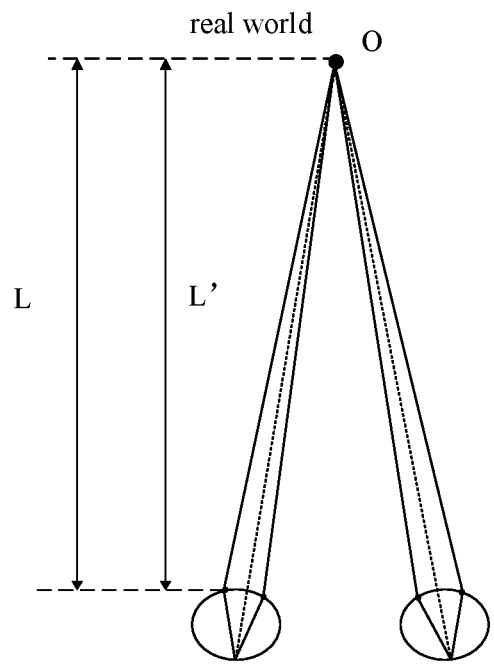
FIG. 1a is a schematic diagram of light path for viewing images with eyes in real world provided in the prior art.
Figure 1B:
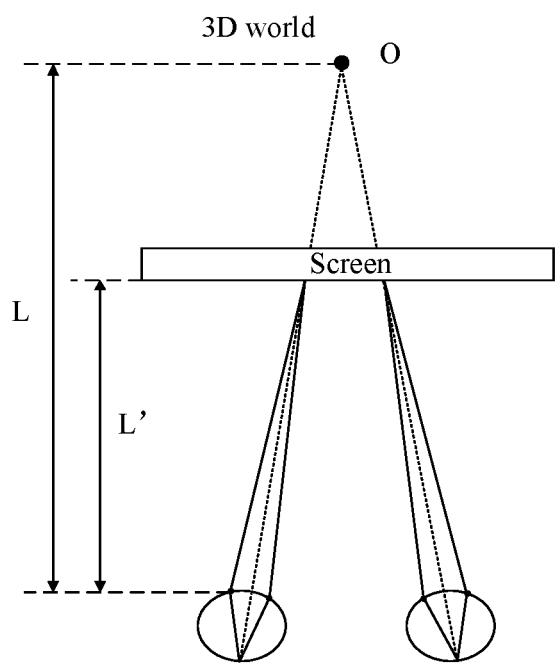
FIG. 1b is a schematic diagram of light path for viewing images with eyes in parallactic 3D world provided in the prior art.
Figure 2:
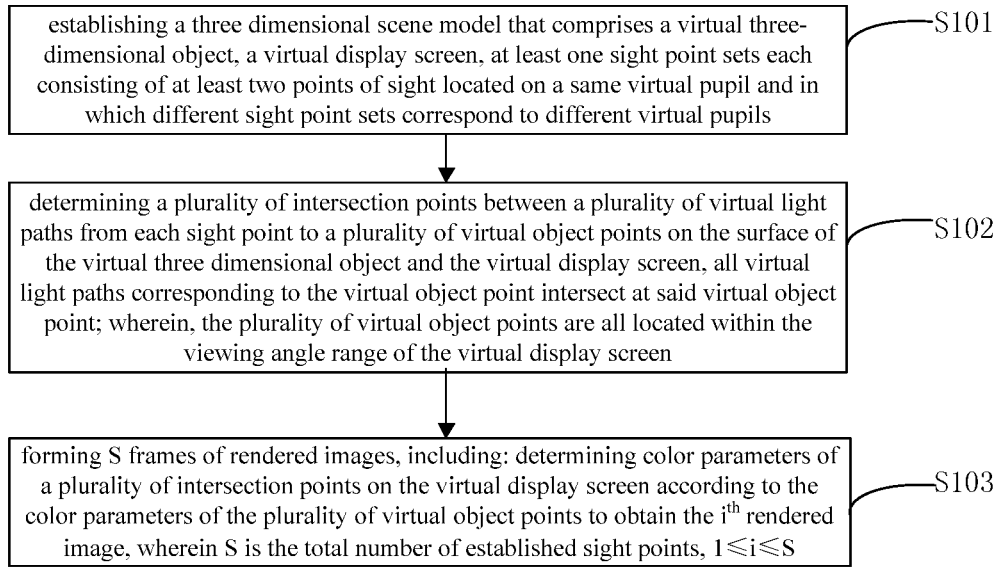
FIG. 2 is a flow chart of an image generating method based on light field rendering provided in an embodiment of the present disclosure.
Figure 3:
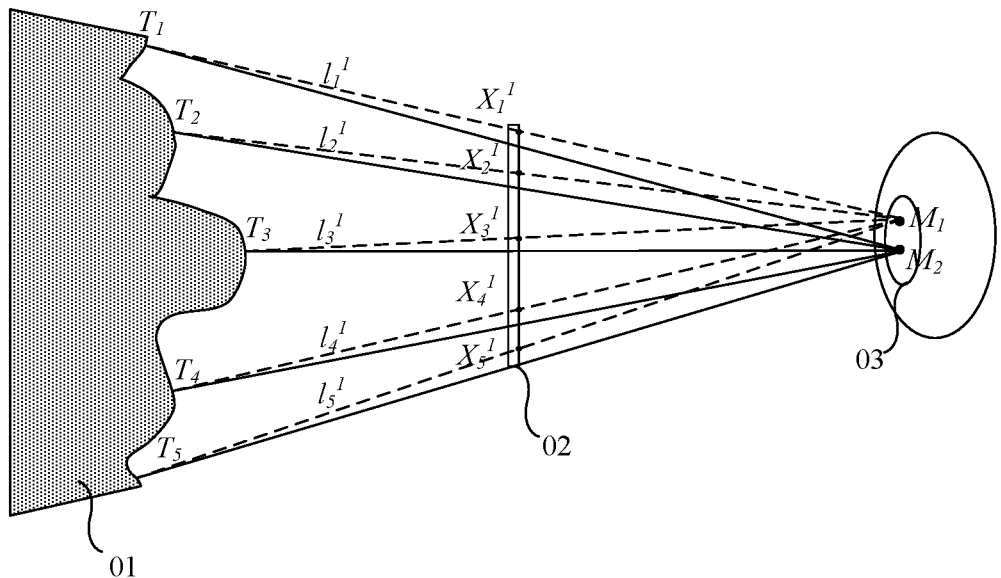
FIG. 3 is a diagram of light path structure of an image generating method based on light field rendering provided in an embodiment of the present disclosure.

Embodiments of the present disclosure provide an image generating method as shown in FIG. 2, including:

step S101, establishing a three dimensional scene model. As shown in FIG. 3, the three dimensional scene model includes a virtual three-dimensional object 01, a virtual display screen 02, at least one sight point sets 03 each including at least two points of sight located on the same virtual pupil and in which different sight point sets correspond to different virtual pupils.

Those skilled in the art should understand that, when the above-mentioned at least one sight point sets are two sets, if these two sets are simulating two virtual pupils of the same person, the relative positions of the two sets should conform to relative positions of two eyes' pupils of most people; and if these two sets are those simulating virtual pupils of different persons, the relative positions of these two sets are not limited.

It is to be noted here, that the above-mentioned three dimensional scene model includes a virtual three-dimensional object 01, a virtual display screen 02, at least one sight point sets 03 means that as shown in FIG. 3, the virtual three-dimensional object 01, the virtual display screen 02 and the at least one sight point set 03 are arranged in sequence, that is, the virtual display screen 02 is located between the virtual three-dimensional object 01 and the at least one sight point set 03 and a plurality of light paths emanating from different sight points towards the same location on the virtual three-dimensional object 01 have a plurality of intersection points with the virtual display screen 02. It is also possible that the virtual display screen 02, the virtual three-dimensional object 01 and the at least one sight point set 03 are arranged in sequence, that is, the virtual three-dimensional object 01 is located between the virtual display screen 02 and the at least one sight point set 03, and the extension lines of light paths emanating from different sight points towards the same location on the virtual three-dimensional object 01 have a plurality of intersection points with the virtual display screen 02. The present disclosure does not impose any limitation to this and in the following embodiments the present disclosure is further explained with respect to an example in which the virtual three-dimensional object 01, the virtual display screen 02 and the at least one sight point set 03 are arranged in sequence.

It is also noted here that each sight point set 03 including at least two sight points at the same virtual pupil means that one virtual pupil corresponds to one sight point set 03 that may include 2 sight points or a plurality of, e.g., 10 sight points and the maximum distance among different sight points does not exceed 2.5 mm to conform to the size of pupil and guarantee that a plurality of sight points fall within one virtual pupil to form one sight point set 03. Of course, the more sight point sets 03 on a virtual pupil, the closer the simulation approximates real eyes. However, increase of the number of sight points will also significantly increase the amount of computation in the simulation process. Therefore, 2-5 sight points may be selected for simulation in a general simulation process.

Step S102, determining a plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to a plurality of virtual object points $\{T_1, T_2, \ldots, T_n\}$ on the surface of the virtual three dimensional object 01 and the virtual display screen 02, all virtual light paths $\{l_k^1, l_k^2, \ldots, l_k^S\}$ corresponding to the virtual object point $T_k$ intersect at said virtual object point $T_k$; wherein, $1 \leq k \leq n$, $1 \leq i \leq S$, S is the total number of established sight points, and the plurality of virtual object points $\{T_1, T_2, \ldots, T_n\}$ are all located within the viewing angle range of the virtual display screen 02.

It is to be noted here that the viewing angle range of the above-mentioned virtual display screen 02 refers to an area covered by the closed surface including extension lines of connecting lines between each sight point $M_i$ in the sight point set 03 and each point at the edge of the virtual display screen 02.

For example, as shown in FIG. 3, taking two sight points $M_1$ and $M_2$ (namely S=2) and five virtual object points $\{T_1,T_2,T_3,T_4,T_5\}$ (namely n=5) on the surface of the virtual three dimensional object 01 as an example, there are five intersection points $\{X_1^1,X_2^1,X_3^1,X_4^1,X_5^1\}$ between five virtual light paths $\{l_1^1,l_2^1,l_3^1,l_4^1,l_5^1\}$ from the sight point $M_1$ to the five virtual object points $\{T_1,T_2,T_3,T_4,T_5\}$ on the surface of the virtual three dimensional object 01 and the virtual display screen 02; and similarly, there are five intersection points $\{X_1^2,X_2^2,X_3^2,X_4^2,X_5^2\}$ between five virtual light paths $\{l_1^2,l_2^2,l_3^2,l_4^2,l_5^2\}$ from the sight point $M_2$ to the five virtual object points $\{T_1,T_2,T_3,T_4,T_5\}$ on the surface of the virtual three dimensional object 01 and the virtual display screen 02, such that all virtual light paths corresponding to the same virtual object point intersect at the virtual object point, that is, $l_1^1, l_1^2$ intersect at $T_1, l_2^1, l_2^2$ intersect at $T_2, l_3^1, l_3^2$ intersect at $T_3$, $l_4^1, l_4^2$ intersect at $T_4$, and $l_5^1, l_5^2$ is intersect at $T_5$. It is similar for other sight points and will not be described any more herein.

Step S103, forming S frames of rendered images, including: determining color parameters of a plurality of intersection points $\{X_1^i, X_2^i, \ldots, X_n^i\}$ on the virtual display screen 02 according to the color parameters of the plurality of virtual object points $\{T_1, T_2, \ldots, T_n\}$ to obtain the ith rendered image.

As shown in FIG. 3, a frame of rendered image is formed for the two sight points $M_1$ and $M_2$ respectively, that is, altogether 2 frames of rendered images are formed, wherein for the sight point $M_1$, it is possible to determine color parameters of the five intersection points $\{X_1^1,X_2^1,X_3^1,X_4^1,X_5^1\}$ on the virtual display screen 02 according to color parameters of five virtual object points $\{T_1,T_2,T_3,T_4,T_5\}$ on the surface of the virtual 3D object 01 to obtain the first frame of rendered image. Similarly, the second frame of rendered image is obtained for the sight point $M_2$, which will not be described any more herein. In addition, the rendered images obtained with the method may be applied to virtual reality display, and may also be applied to augmented reality display, which is not limited in the present disclosure.

Since the above-mentioned S frames of rendered images are obtained by obtaining color parameters of a plurality of intersection points $\{X_1^i, X_2^i, \ldots, X_n^i\}$ on the virtual display screen by a plurality of virtual light paths $\{l_1^i, l_2^i, \ldots, l_n^i\}$ from each sight point $M_i$ in a sight point set located on at least one virtual pupil to a plurality of virtual object points $\{T_1, T_2, \ldots, T_n\}$ on the surface of the virtual 3D object in which all virtual light paths corresponding to each virtual object point interest at the virtual object point according to the color parameters of a plurality of virtual object points $\{T_1, T_2, \ldots, T_n\}$ on the surface of the virtual 3D object. Then At least 2 frames of rendered images may be obtained by at least two sight points in the sight point set in one virtual pupil, that is, a rendered image with 3D effect may be obtained by one virtual pupil. Further, the focusing distance of one virtual pupil for the rendered image obtained by the sight point set through the pupil equals to the sight line aggregating distance of two virtual pupils that obtain rendered images with 3D effect through sight point sets in corresponding virtual pupil respectively, that is the focusing distance of a single eye and the focusing position of the aggregating distance of sight lines of two eyes are both located at the surface of the virtual three-dimensional object, which in turn enables the focusing distance of a single eye to be consistent with the aggregating distance of two eyes' sight lines when the rendered picture is applied to display.

It is noted here that the S frames of rendered images obtained by the above-mentioned method may be displayed in turn periodically according to the timing while used for display, that is different rendered images are displayed at different time instants in one period.

Of course, it is also possible to display the S frames of rendered images at the same time. For example, at the same time instant, the S frames of rendered images are acquired directly on the virtual display screen 02. Taking 2 frames of rendered images as an example, at the same time instant, the first line on the virtual display screen 02 is the first frame of rendered image, the second line is the second frame of rendered image, and then the S frames of rendered images acquired by the virtual display screen 02 is used directly for display.

As another example, it is possible to acquire S frames of separated rendered images on the virtual display screen 02 at different time instants in one period. When the S frames of separated rendered images are displayed in a specific application, the S frames of separated rendered images are displayed at the same time. Specifically, taking a rendered image including 2 frames of separated rendered images as an example, when the first line on a real display screen is a first frame of rendered image, the second line is the second frame of rendered image. Of course, the resolution of the rendered images displayed by the real display screen is one half of the resolution of the separated rendered images acquired on the virtual display screen 02.

On this basis, the above-mentioned each sight point set 03 may include one emitting sight point and one backtracking sight point. In this case, in the above-mentioned step S102, determining the plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to the plurality of virtual object points $\{T_1, T_2, \ldots, T_n\}$ on the surface of the virtual 3D object 01 includes the following operation.

In the viewing angle range of the virtual display screen 02, as shown in FIG. 3, taking sight point $M_1$ being emitting sight point and sight point $M_2$ being backtracking sight point as an example.

First, simulate a plurality of first light rays emitted by the emitting sight point $M_1$ and arriving at the surface of the virtual 3D object via the virtual display screen 02 to acquire the first intersection points $\{X_1^1, X_2^1, \ldots, X_n^1\}$ between the plurality of first light rays and the virtual display screen 02, with the intersection point of the first light rays and the virtual 3D object being the virtual object point $\{T_1, T_2, \ldots, T_n\}$.

Then, simulate emitting second light rays from the plurality of said virtual object points $\{T_1, T_2, \ldots, T_n\}$ to said backtracking sight point $M_2$ to obtain the second intersection points $\{X_1^2, X_2^2, \ldots, X_n^2\}$ between the plurality of second light rays and the virtual display screen 02.

As such, by emitting light at the emitting sight point toward the virtual object point and then emitting light from the virtual object point toward the backtracking sight point, it is possible to enable the light path from the emitting sight point to the virtual object point and the light path from the backtracking sight point to the virtual object point meet at the position of the virtual object point accurately and quickly, thereby it is possible to obtain rendered images with more reality while increasing the rendering speed and have a better light field display effect while applying the rendered images to three-dimensional display.

It is to be noted here that what have been described above are described with only an example in which one sight point set 03 may include one emitting sight point and one backtracking sight point. In practical simulation process and applications, for example, one sight point set 03 may include a plurality of emitting sight points and backtracking sight points corresponding to the plurality of emitting sight points respectively. As another example, one sight point set 03 may include one emitting sight point and a plurality of backtracking sight points. The specific process is the same as above and will not be described any more herein. Of course, the numbers of emitting sight points and backtracking sight points in one sight point set 03 are not limited in the present disclosure so long as it includes at least one emitting sight point and one backtracking sight point corresponding to the emitting sight point and at least 2 frames of rendered images are formed at the virtual display screen 02.

Based on this, further, the above-mentioned simulating a plurality of first light rays emitting from the emitting sight point $M_1$ to the surface of the virtual 3D object 01 via the virtual display screen 02 in the viewing angle range of the virtual display screen 02 includes: in the viewing angle range of the virtual display screen 02, simulating a plurality of first light rays evenly emitting from the emitting sight point to the surface of the virtual 3D object 01 such that evenly distributed first intersection points $\{X_1^1, X_2^1, \ldots, X_n^1\}$ and second intersection points $\{X_1^2, X_2^2, \ldots, X_n^2\}$ may be obtained at the virtual display screen 02 and the formed rendered images are realer without image distortion and twisting, especially for realizing single eye focusing 3D.

It is to be noted here that the above-mentioned emitting a plurality of first light rays uniformly to the surface of the virtual three-dimensional object 01 is only a preferred solution of the present disclosure, and in practical applications, it is possible to emit a plurality of first light rays randomly to the surface of the virtual three-dimensional object 01 or emit a plurality of first light rays to the surface of the virtual three-dimensional object 01 according to predetermined distribution, which is not limited in the present disclosure.

In addition, in the above-mentioned step 103, determining color parameters of a plurality of intersection points $\{X_1^i, X_2^i, \ldots, X_n^i\}$ on the virtual display screen 02 according to color parameters of the plurality of virtual object points $\{T_1, T_2, \ldots, T\}$ includes:

determining color parameters of the plurality of intersection points $\{X_1^i, X_2^i, \ldots, X_n^i\}$ on the virtual display screen 02 as color parameters of the plurality of virtual object points $\{T_1, T_2, \ldots, T_n\}$, in which case, the colors of the plurality of intersection points $\{X_1^i, X_2^i, \ldots, X_n^i\}$ on the virtual display screen 02 are the same as that of the plurality of virtual object points $\{T_1, T_2, \ldots, T_n\}$ on the surface of the virtual 3D object 01.

Of course, it is also possible to calculate color parameters of the plurality of intersection points $\{X_1^i, X_2^i, \ldots, X_n^i\}$ on the virtual display screen 02 according to at least one parameter of angles between the plurality of virtual light paths $\{l_1^i, l_2^i, \ldots, l_n^i\}$ and the normal line of the virtual display screen 02, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object 01 is located and the material of the surface of the virtual 3D object 01 and color parameters of the virtual object points $\{T_1, T_2, \ldots, T_n\}$. In such way, the obtained rendered images are closer to images of 3D objects human eyes can really see and are realer, especially for realizing single eye focusing 3D.

It is to be noted here that above obtained color parameters of the plurality of intersection points $\{X_1^i, X_2^i, \ldots, X_n^i\}$ on the virtual display screen may be a virtual 3D object 01 established by simulating a 3D object in real world that is located in a light field approximating reality and the rendered images obtained by at least one parameter of the illumination parameter of the light field and the material of the surface of the virtual 3D object 01 and color parameters of the plurality of virtual object points $\{T_1, T_2, \ldots, T_n\}$ are substantially consistent with real world. It is also possible to simulate a virtual 3D object 01 that is different from 3D objects in real world, such as a 3D object with art or cartoon effect. Artistic effect may be added to rendered images obtained by at least one parameter of the illumination parameter of light field and the material of the surface of the virtual 3D object 01 and color parameters of the plurality of virtual object points $\{T_1, T_2, \ldots, T_n\}$ based on compliance to certain theory, thereby obtaining rendered images not completely consistent with real world. This is not limited in the present disclosure.

Figure 4:
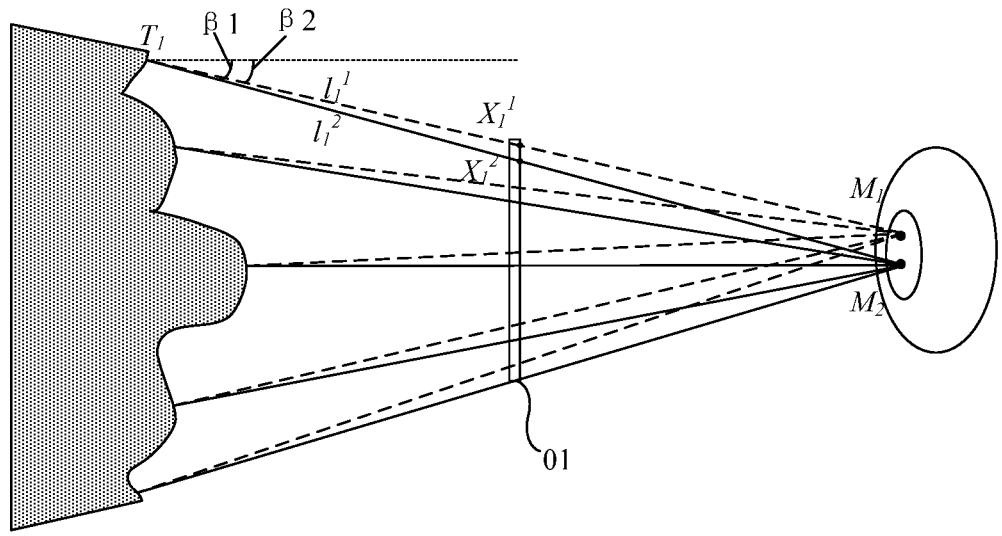
FIG. 4 is a diagram of light path structure of another image generating method based on light field rendering provided in an embodiment of the present disclosure.

For example, related parameters may be obtained by ray tracking method. Taking the angle between a virtual light path and the normal line of a virtual display screen 02 as an example, as shown in FIG. 4, for the same one virtual object point $T_1$, since the angles $\beta$ 1 and $\beta$ 2 between virtual light paths $l_1^1$ and $l_1^2$ from different sight point $M_1$ and $M_2$ to the virtual object point $T_1$ and the normal line of the virtual display screen 02 are different, in this case, there may be certain difference among color parameters of the plurality of intersection points $\{X_1^i, X_2^i, \ldots, X_n^i\}$ calculated on the virtual display screen 01 according to the different angles in combination with color parameters of the plurality of virtual object points $\{T_1, T_2, \ldots, T_n\}$. In this case, there may be certain difference between the colors of the plurality of intersection points $\{X_1^1, X_2^1, \ldots, X_n^1\}$ and $\{X_1^2, X_2^2, \ldots, X_n^2\}$ on the virtual display screen 02 and the colors of the plurality of virtual object points $\{T_1, T_2, \ldots, T_n\}$ on the surface of the virtual 3D object, which approximates more the different visual effects of viewing a 3D object at different angles with human eyes, thereby obtaining realer 3D objects by rendering.

Furthermore, in the above-mentioned step 103, forming S frames of rendered images further includes: adjusting the resolution of the ith frame of rendered image to be consistent with the resolution of the virtual display screen 02 with interpolation method.

For example, it is possible to adopt the Nearest-Neighbor Interpolation, linear interpolation, cubic interpolation or spline interpolation to adjust the resolution of the ith frame of rendered image, which is not limited in the present disclosure.

Figure 5A:
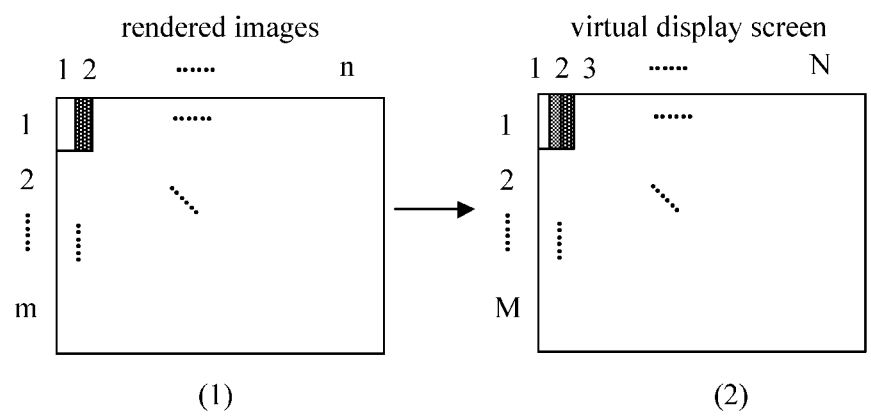
FIG. 5a is a diagram a structure for adjusting the rendering image resolution to be consistent with the virtual display screen resolution provided in an embodiment of the present disclosure.

For example, as shown in FIG. 5a, consider an example in which the obtained ith frame of rendered image, namely (1) in FIG. 5a has a resolution (m×n) smaller than that (M×N) of the virtual display screen, namely (2) in FIG. 5a, wherein m is less than M, n is less than N. Taking adjusting the number of pixel columns of a rendered image to be equal to that of the virtual display screen as an example, as shown in FIG. 5a, it is possible to add some pixel columns in partial areas in the rendered image such that the number of pixel columns of the rendered image equals that of the virtual display screen. The color parameters of the added pixel columns may be obtained with the above-mentioned interpolation and color parameters corresponding to the added pixel columns on the virtual display screen 02 may be obtained by interpolating color parameters of a plurality of pixel points in pixel columns adjacent to the added pixel columns on the rendered image. Of course, it is also possible to average color parameters of a plurality of pixel points in adjacent pixel columns on the rendered image to obtain color parameters of the corresponding added pixel columns on the virtual display screen 02.

Figure 5B:
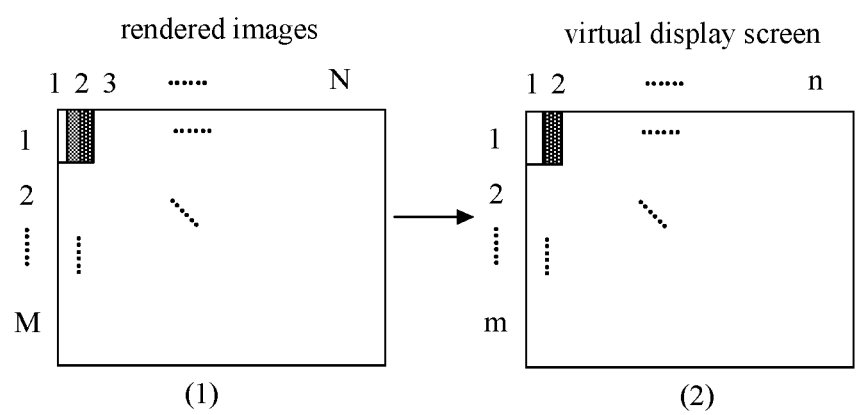
FIG. 5b is a diagram of another structure for adjusting the rendering image resolution to be consistent with the virtual display screen resolution provided in an embodiment of the present disclosure.

As another example, as shown in FIG. 5*b*, consider an example in which the obtained ith frame of rendered image, namely (1) in FIG. 5*b* has a resolution (M×N) greater than that (m×n) of the virtual display screen, namely (2) in FIG. 5*b*, wherein m is greater than m, N is greater than n. Taking adjusting the number of pixel columns in the rendered image to be equal to that of the virtual display screen as an example, as shown in FIG. 5*b*, it is possible to delete some pixel columns directly in partial areas in the rendered image such that the number of pixel columns in the rendered image equals that of the virtual display screen. Of course, it is also possible to perform calculation on color parameters of pixel columns adjacent to the deleted pixel columns on the rendered image after deleting some pixel columns with the above-mentioned interpolation method to obtain color parameters of pixel columns at corresponding locations on the virtual display screen 02.

In addition, adjusting the number of pixel columns in the rendered image to be equal to that of the virtual display screen is similar to the above-mentioned adjustment of the number of pixel columns and will not be described any more herein.

Figure 6:
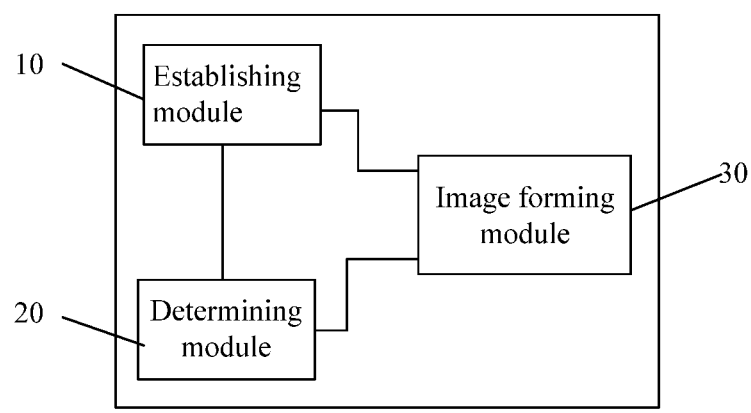
FIG. 6 is an image generating device based on light field rendering provided in an embodiment of the present disclosure.

An embodiment of the present disclosure further provides an image generating device that may be software or hardware or combination thereof, in which the implementations of various functional modules may be as described in the above-mentioned embodiments and will not be described any more herein. For example, as shown in FIG. 6, the device includes:

An establishing module 10 for establishing a three-dimensional model. As shown in FIG. 3, the three dimensional scene model includes a virtual three-dimensional object 01, a virtual display screen 02, at least one sight point sets 03 each including at least two points of sight located on the same virtual pupil and in which different sight point sets correspond to different virtual pupils.

A determining module 20 for determining a plurality of intersection points $\{X_1^i, X_2^i, \ldots, X_n^i\}$ between a plurality of virtual light paths $\{1_1^i, 1_2^i, \ldots, 1_n^i\}$ from each sight point $M_i$ to a plurality of virtual object points $\{T_1, T_2, \ldots, T_n\}$ on the surface of the virtual 3D object 01; wherein $1 \le i \le S$, S is the total number of established sight points and the plurality of virtual object points are all located in the viewing angle range of the virtual display screen 02. Specifically, when determining the related plurality of intersection points $\{X_1^i, X_2^i, \ldots, X_n^i\}$ and related parameters using the aforementioned ray tracking method, the determining module 20 may also be referred to as tracking module.

An image forming module 30 for forming S frames of rendered images including determining color parameters of a plurality of intersection points $\{X_1^i, X_2^i, \ldots, X_n^i\}$ on the virtual display screen 02 according to color parameters of a plurality of virtual object points $\{T_1, T_2, \ldots, T_n\}$ to obtain the ith frame of rendered image.

It is to be noted that modules in the present embodiment may be a separately disposed processor, or may be integrated in a certain processor of the image generating device, or may be stored in a memory of the image generating device in the form of program codes to be invoked by a certain processor of the image generating device and execute functions of the above-mentioned units. The processor mentioned herein may be a central processor (Central Processing Unit, CPU), a graphics processor (Graphics Processing Unit, GPU) or a specific integrated circuit (Application Specific Integrated Circuit, aSIC), or alternatively may be configured to implement one or more integrated circuits of embodiments of the present disclosure.

An embodiment of the present disclosure provides an image generating device used in any one of the above-described image generating methods which has the same beneficial effects as the image generating method provided in the aforementioned embodiments. Since beneficial effects of the image generating method have been described in detail in the aforementioned embodiments, they will not be described any more herein.

Furthermore, in case that each sight point set includes of one emitting sight point and one backtracking sight point, the above-mentioned determining module 20 includes: a light ray simulating unit for simulating a plurality of light rays emitted by the emitting sight point to the surface of the virtual 3D object via the virtual display screen in the viewing angle range of the virtual display screen 02; and an intersection point obtaining unit for obtaining first intersection points between the plurality of first light rays and the virtual display screen; in which the light ray simulating unit is further configured to simulate emitting a plurality of second light rays from a plurality of virtual object points $\{T_1, T_2, \ldots, T_n\}$ towards the backtracking sight point in case that intersection points between the first light rays and the surface of the virtual 3D object 01 are virtual object points $\{T_1, T_2, \ldots, T_n\}$; and the intersection point obtaining unit is further configured to obtain second intersection points between the plurality of second light rays and the virtual display screen 02.

As such, by emitting light at the emitting sight point toward the virtual object point and then emitting light from the virtual object point toward the backtracking sight point, it is possible to enable the light path from the emitting sight point to the virtual object point and the light path from the backtracking sight point to the virtual object point meet at the position of the virtual object point accurately and quickly, thereby it is possible to obtain rendered images with more reality while increasing the rendering speed and have a better light field display effect while applying the rendered images to three-dimensional display.

In addition, the above-mentioned light ray simulation unit may be configured to, in the viewing angle range of the virtual display screen 02, simulate a plurality of first light rays uniformly emitting from the emitting sight point to the surface of the virtual 3D object 01 such that evenly distributed first intersection points $\{X_1^1, X_2^1, \ldots, X_n^1\}$ and second intersection points $\{X_1^2, X_2^2, \ldots, X_n^2\}$ may be obtained at the virtual display screen 02 and the formed rendered images are realer without image distortion and twisting, especially for realizing single eye focusing 3D.

Furthermore, the above-mentioned image forming module 30 is specifically configured to determine color parameters of the plurality of intersection points $\{X_1^i, X_2^i, \ldots, X_n^i\}$ on the virtual display screen 02 as color parameters of the plurality of virtual object points $\{T_1, T_2, \ldots, T_n\}$.

Alternatively, the above-mentioned image forming module 30 may be configured to calculate color parameters of the plurality of intersection points $\{X_1^i, X_2^i, \ldots, X_n^i\}$ on the virtual display screen 02 according to at least one parameter of angles between the plurality of virtual light paths $\{1_1^i, 1_2^i, \ldots, 1_n^i\}$ and the normal line of the virtual display screen 02, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object 01 is located and the material of the surface of the virtual 3D object 01 and color parameters of the virtual object points $\{T_1, T_2, \ldots, T_n\}$. In such way, the obtained rendered images are closer to images of 3D objects human eyes can really see and are realer, especially for realizing single eye focusing 3D.

Based on this, the above-mentioned image forming module 30 is further configured to adjust the resolution of the ith frame of rendered image to be consistent with the resolution of the virtual display screen 02 using interpolation method. Specifically, the image forming module 30 may adopt the Nearest-Neighbor Interpolation, linear interpolation, cubic interpolation or spline interpolation to adjust the resolution of the ith frame of rendered image, which is not limited in the present disclosure.

Furthermore, according to at least one embodiment of the present disclosure, there is further provided an computer executable non-volatile storage medium in which program instructions are stored, while being executed by said computer, which causes said computer to: establish a three dimensional scene model that includes a virtual three-dimensional object, a virtual display screen, at least one sight point sets each including of at least two points of sight located on the same virtual pupil and in which different sight point sets correspond to different virtual pupils; determining a plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to a plurality of virtual object points $\{T_1, T_2, \ldots, T_n\}$ on the surface of the virtual three dimensional object 01 and the virtual display screen 02, all virtual light paths $\{l_k^1, l_k^2, \ldots, X_k^S\}$ corresponding to the virtual object point $T_k$ intersect at said virtual object point $T_k$; wherein, $1 \leq k \leq n$, $1 \leq i \leq S$, S is the total number of established sight points, and the plurality of virtual object points $\{T_1, T_2, \ldots, T_n\}$ are all located within the viewing angle range of the virtual display screen 02; forming S frames of rendered images, including: determining color parameters of a plurality of intersection points $\{X_1^i, X_2^i, \ldots, X_n^i\}$ on the virtual display screen according to the color parameters of the plurality of virtual object points $\{T_1, T_2, \ldots, T_n\}$ to obtain the ith rendered image.

For example, each of said sight point sets may include one emitting sight point and one backtracking sight point. Said determining the plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to the plurality of virtual object points $\{T_1, T_2, \ldots, T_n\}$ on the surface of said virtual 3D object, all virtual light paths $\{l_k^1, l_k^2, \ldots, l_k^S\}$ corresponding to the virtual object point $T_k$ intersect at said virtual object point $T_k$ includes: in the viewing angle range of said virtual display screen, simulating a plurality of first light rays emitted by the emitting sight point and arriving at the surface of the virtual 3D object via the virtual display screen to acquire the first intersection points between plurality of first light rays and the virtual display screen, with the intersection points of the first light rays and the virtual 3D object being the virtual object point $\{T_1, T_2, \ldots, T_n\}$ simulating emitting second light rays from the plurality of said virtual object points $\{T_1, T_2, \ldots, T_n\}$ to said backtracking sight point to obtain the second intersection points between the plurality of second light rays and the virtual display screen.

For example, said simulating a plurality of first light rays emitted from said emitting sight point to the surface of said virtual three-dimensional object via said virtual display screen in the viewing angle range of said virtual display screen includes: simulating a plurality of first rays emitted uniformly from said emitting sight point towards the surface of said virtual three-dimensional object in the viewing angle range of said virtual display screen.

For example, said determining color parameters of a plurality of intersection points $\{X_1^i, X_2^i, \ldots, X_n^i\}$ on the virtual display screen according to color parameters of the plurality of virtual object points $\{T_1, T_2, \ldots, T_n\}$ includes: determining color parameters of the plurality of intersection points $\{X_1^i, X_2^i, \ldots, X_n^i\}$ on the virtual display screen as color parameters of the plurality of virtual object points $\{T_1, T_2, \ldots, T_n\}$; or calculating color parameters of the plurality of intersection points $\{X_1^i, X_2^i, \ldots, X_n^i\}$ on the virtual display screen according to at least one parameter of angles between the plurality of virtual light paths $\{l_1^i, l_2^i, \ldots, l_n^i\}$ and the normal line of the virtual display screen, distances between the plurality of intersection points $\{X_1^i, X_2^i, \ldots, X_n^i\}$ and the plurality of virtual object points $\{T_1, T_2, \ldots, T_n\}$, illumination parameters of the light field where said virtual 3D object is located and the material of the surface of the virtual 3D object and color parameters of the virtual object points $\{T_1, T_2, \ldots, T_n\}$.

For example, said forming S frames of rendered images further includes: adjusting the resolution of said ith frame of rendered image to be consistent with the resolution of said virtual display screen using interpolation method. Those of ordinary skill in the art may understand: all or partial steps for implementing the above-mentioned method embodiment may be implemented by hardware associated with program instructions, and the aforementioned program may be stored in a computer-readable storage medium and carries out steps including the above-mentioned method embodiments while being executed; while the aforementioned storage medium includes various media that can store program codes such as ROM, RAM, disk or optical disk.

What are described above is related to the illustrative embodiments of the disclosure only and not limitative to the scope of the disclosure. Obvious variations and replacement by any one of the skilled person in the art in the technical scope of the disclosure should be all covered in the scope of this disclosure. The scopes of the disclosure are defined by the accompanying claims.

The present application claims priority of China Patent application No. 201610922174.2 filed on Oct. 21, 2016, the content of which is incorporated in its entirety as part of the present application by reference herein.

The invention claimed is:

1. An image generating method, comprising:
establishing a three dimensional scene model that comprises a virtual three-dimensional object, a virtual display screen, at least one sight point sets each comprising at least two points of sight located on a same virtual pupil and in which different sight point sets correspond to different virtual pupils;
determining a plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to a plurality of virtual object points $\{T_1, T_2, \ldots, T_n\}$ on the surface of the virtual three dimensional object and the virtual display screen, all virtual light paths $\{l_k^1, l_k^2, \ldots, l_k^S\}$ corresponding to the virtual object point $T_k$ intersect at the virtual object point $T_k$; wherein, $1 \leq k \leq n$, $1 \leq i \leq S$, S is the total number of established sight points, and the plurality of virtual object points $\{T_1, T_2, \ldots, T_n\}$ are all located within the viewing angle range of the virtual display screen;
forming S frames of rendered images, comprising: determining color parameters of a plurality of intersection points $\{X_1^i, X_2^i, \ldots, X_n^i\}$ on the virtual display screen according to the color parameters of the plurality of virtual object points $\{T_1, T_2, \ldots, T_n\}$ to obtain the $i^{th}$ rendered image.

2. The method of claim 1, wherein each of the sight point sets comprises one emitting sight point and one backtracking sight point;

the determining the plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to the plurality of virtual object points $\{T_1, T_2, \ldots, T_n\}$ on the surface of the virtual 3D object and the virtual display screen, all virtual light paths $\{l_k^1, l_k^2, \ldots, l_k^S\}$ corresponding to the virtual object point $T_k$ intersect at the virtual object point $T_k$ comprises:

simulating a plurality of first light rays emitted from the emitting sight point to the surface of the virtual three-dimensional object via the virtual display screen in a viewing angle range of the virtual display screen to obtain first intersection points between the plurality of first light rays and the virtual display screen, intersection points between the first rays and the surface of the virtual three-dimensional object being virtual object points $\{T_1, T_2, \ldots, T_n\}$;

simulating emitting second light rays from the plurality of virtual object points $\{T_1, T_2, \ldots, T_n\}$ to the backtracking sight point to obtain second intersection points between the plurality of the second light rays and the virtual display screen.

3. The method of claim 2, wherein the simulating a plurality of first light rays emitted from the emitting sight point to the surface of the virtual three-dimensional object via the virtual display screen in the viewing angle range of the virtual display screen comprises:

simulating a plurality of first rays emitted uniformly from the emitting sight point towards the surface of the virtual three-dimensional object in the viewing angle range of the virtual display screen.

4. The method of claim 1, wherein the determining color parameters of a plurality of intersection points $\{X_1^i, X_2^i, \ldots, X_n^i\}$ on the virtual display screen according to color parameters of the plurality of virtual object points $\{T_1, T_2, \ldots, T_n\}$ comprises:

determining color parameters of the plurality of intersection points $\{X_1^i, X_2^i, \ldots, X_n^i\}$ on the virtual display screen as color parameters of the plurality of virtual object points $\{T_1, T_2, \ldots, T_n\}$;

or calculating color parameters of the plurality of intersection points $\{X_1^i, X_2^i, \ldots, X_n^i\}$ on the virtual display screen according to at least one parameter of angles between the plurality of virtual light paths $\{l_1^i, l_2^i, \ldots, l_n^i\}$ and the normal line of the virtual display screen, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object is located and the material of the surface of the virtual 3D object, and color parameters of the virtual object points $\{T_1, T_2, \ldots, T_n\}$.

5. The method of claim 1, wherein the forming S frames of rendered images further comprises:

adjusting the resolution of the $i^{th}$ frame of rendered image to be consistent with the resolution of the virtual display screen using interpolation method.

6. A image generating device, comprising:
an establishing module configured to establish a three dimensional scene model that comprises a virtual three-dimensional object, a virtual display screen, at least one sight point sets each comprising at least two points of sight located on a same virtual pupil and in which different sight point sets correspond to different virtual pupils;

a determining module configured to determine a plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to a plurality of virtual object points $\{T_1, T_2, \ldots, T_n\}$ on the surface of the virtual three dimensional object and the virtual display screen, all virtual light paths $\{l_k^1, l_k^2, \ldots, l_k^S\}$ corresponding to the virtual object point $T_k$ intersect at the virtual object point $T_k$; wherein, $1 \le k \le n$, $1 \le i \le S$, S is the total number of established sight points, and the plurality of virtual object points $\{T_1, T_2, \ldots, T_n\}$ are all located within the viewing angle range of the virtual display screen; and an image forming module configured to form S frames of rendered images, comprising: determining color parameters of a plurality of intersection points $\{X_1^i, X_2^i, \ldots, X_n^i\}$ on the virtual display screen according to the color parameters of the plurality of virtual object points $\{T_1, T_2, \ldots, T_n\}$ to obtain the $i^{th}$ rendered image.

7. The device of claim 6, wherein each of the sight point sets comprises one emitting sight point and one backtracking sight point;

the determining module comprises:
a light ray simulation unit configured to simulating a plurality of first light rays emitted from the emitting sight point to a surface of the virtual three-dimensional object via the virtual display screen in a viewing angle range of the virtual display screen;

an intersection point obtaining unit configured to obtain first intersection points between the plurality of first light rays and the virtual display screen, the intersection points between the first light rays and the surface of the virtual three-dimensional object being virtual object points $\{T_1, T_2, \ldots, T_n\}$;

the light ray simulation unit being further configured to simulate emitting second light rays from a plurality of the virtual object points $\{T_1, T_2, \ldots, T_n\}$ to the backtracking sight point;

the intersection point obtaining unit being further configured to obtain second intersection points between a plurality of the second light rays and the virtual display screen.

8. The device of claim 7, wherein the light ray simulation unit is specifically configured to simulate emitting uniformly a plurality of first light rays from the emitting sight point to the surface of the virtual three-dimensional object in the viewing angle range of the virtual display screen.

9. The device of claim 6, wherein the image forming module is further configured to determine color parameters of the plurality of intersection points $\{X_1^i, X_2^i, \ldots, X_n^i\}$ on the virtual display screen as color parameters of the plurality of virtual object points $\{T_1, T_2, \ldots, T_n\}$;

or calculate color parameters of the plurality of intersection points $\{X_1^i, X_2^i, \ldots, X_n^i\}$ on the virtual display screen according to at least one parameter of angles between the plurality of virtual light paths $\{l_1^i, l_2^i, \ldots, l_n^i\}$ and the normal line of the virtual display screen, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object is located and the material of the surface of the virtual 3D object, and color parameters of the virtual object points $\{T_1, T_2, \ldots, T_n\}$.

10. The device of claim 6, wherein the image forming module is further configured to adjust the resolution of the $i^{th}$ frame of rendered image to be consistent with the resolution of the virtual display screen using interpolation method.

11. A computer executable non-volatile storage medium in which program instructions are stored that, while being executed by the computer, cause the computer to:
   establish a three dimensional scene model that comprises a virtual three-dimensional object, a virtual display screen, at least one sight point sets each comprising at least two points of sight located on a same virtual pupil and in which different sight point sets correspond to different virtual pupils;
   determine a plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to a plurality of virtual object points $\{T_1, T_2, \ldots, T_n\}$ on the surface of the virtual three dimensional object and the virtual display screen, all virtual light paths $\{l_k^1, l_k^2, \ldots, l_k^S\}$ corresponding to the virtual object point $T_k$ intersect at the virtual object point $T_k$; wherein, $1 \le k \le n$, $1 \le i \le S$, S is the total number of established sight points, and the plurality of virtual object points $\{T_1, T_2, \ldots, T_n\}$ are all located within the viewing angle range of the virtual display screen; and
   form S frames of rendered images, comprising: determining color parameters of a plurality of intersection points $\{X_1^i, X_2^i, \ldots, X_n^i\}$ on the virtual display screen according to the color parameters of the plurality of virtual object points $\{T_1, T_2, \ldots, T_n\}$ to obtain the $i^{th}$ rendered image.

12. The storage medium of claim 11, wherein each of the sight point sets comprises one emitting sight point and one backtracking sight point;
   the determining the plurality of intersection points $\{X_1^i, X_2^i, \ldots, X_n^i\}$ between a plurality of virtual light paths $\{l_1^i, l_2^i, \ldots, l_n^i\}$ from each sight point $M_i$ to the plurality of virtual object points $\{T_1, T_2, \ldots, T_n\}$ on the surface of the virtual 3D object and the virtual display screen, all virtual light paths $\{l_k^1, l_k^2, \ldots, l_k^S\}$ corresponding to the virtual object point $T_k$ intersect at the virtual object point $T_k$ comprises:
   simulating a plurality of first light rays emitted from the emitting sight point to the surface of the virtual three-dimensional object via the virtual display screen in a viewing angle range of the virtual display screen to obtain first intersection points between the plurality of first light rays and the virtual display screen, intersection points between the first rays and the surface of the virtual three-dimensional object being virtual object points $\{T_1, T_2, \ldots, T_n\}$;
   simulating emitting second light rays from the plurality of virtual object points $\{T_1, T_2, \ldots, T_n\}$ to the backtracking sight point to obtain second intersection points between the plurality of the second light rays and the virtual display screen.

13. The storage medium of claim 12, wherein the simulating a plurality of first light rays emitted from the emitting sight point to the surface of the virtual three-dimensional object via the virtual display screen in the viewing angle range of the virtual display screen comprises:
   simulating a plurality of first rays emitted uniformly from the emitting sight point towards the surface of the virtual three-dimensional object in the viewing angle range of the virtual display screen.

14. The storage medium of claim 11, wherein the determining color parameters of a plurality of intersection points $\{X_1^i, X_2^i, \ldots, X_n^i\}$ on the virtual display screen according to color parameters of the plurality of virtual object points $\{T_1, T_2, \ldots, T_n\}$ comprises:
   determining color parameters of the plurality of intersection points $\{X_1^i, X_2^i, \ldots, X_n^i\}$ on the virtual display screen as color parameters of the plurality of virtual object points $\{T_1, T_2, \ldots, T_n\}$;
   or calculating color parameters of the plurality of intersection points $\{X_1^i, X_2^i, \ldots, X_n^i\}$ on the virtual display screen according to at least one parameter of angles between the plurality of virtual light paths $\{l_1^i, l_2^i, \ldots, l_n^i\}$ and the normal line of the virtual display screen, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object is located and the material of the surface of the virtual 3D object, and color parameters of the virtual object points $\{T_1, T_2, \ldots, T_n\}$.

15. The storage medium of claim 11, wherein the forming S frames of rendered images further comprises: adjusting the resolution of the $i^{th}$ frame of rendered image to be consistent with the resolution of the virtual display screen using interpolation method.

16. The method of claim 2, wherein the determining color parameters of a plurality of intersection points $\{X_1^i, X_2^i, \ldots, X_n^i\}$ on the virtual display screen according to color parameters of the plurality of virtual object points $\{T_1, T_2, \ldots, T_n\}$ comprises:
   determining color parameters of the plurality of intersection points $\{X_1^i, X_2^i, \ldots, X_n^i\}$ on the virtual display screen as color parameters of the plurality of virtual object points $\{T_1, T_2, \ldots, T_n\}$;
   or calculating color parameters of the plurality of intersection points $\{X_1^i, X_2^i, \ldots, X_n^i\}$ on the virtual display screen according to at least one parameter of angles between the plurality of virtual light paths $\{l_1^i, l_2^i, \ldots, l_n^i\}$ and the normal line of the virtual display screen, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object is located and the material of the surface of the virtual 3D object, and color parameters of the virtual object points $\{T_1, T_2, \ldots, T_n\}$.

17. The method of claim 3, wherein the determining color parameters of a plurality of intersection points $\{X_1^i, X_2^i, \ldots, X_n^i\}$ on the virtual display screen according to color parameters of the plurality of virtual object points $\{T_1, T_2, \ldots, T_n\}$ comprises:
   determining color parameters of the plurality of intersection points $\{X_1^i, X_2^i, \ldots, X_n^i\}$ on the virtual display screen as color parameters of the plurality of virtual object points $\{T_1, T_2, \ldots, T_n\}$;
   or calculating color parameters of the plurality of intersection points $\{X_1^i, X_2^i, \ldots, X_n^i\}$ on the virtual display screen according to at least one parameter of angles between the plurality of virtual light paths $\{l_1^i, l_2^i, \ldots, l_n^i\}$ and the normal line of the virtual display screen, distances between the plurality of intersection points $\{X_1^i, X_2^i, \ldots, X_n^i\}$ and the plurality of virtual object points $\{T_1, T_2, \ldots, T_n\}$, illumination parameters of the light field where the virtual 3D object is located and the material of the surface of the virtual 3D object, and color parameters of the virtual object points $\{T_1, T_2, \ldots, T_n\}$.

18. The method of claim 2, wherein the forming S frames of rendered images further comprises:
   adjusting the resolution of the $i^{th}$ frame of rendered image to be consistent with the resolution of the virtual display screen using interpolation method.

19. The method of claim 3, wherein the forming S frames of rendered images further comprises:
   adjusting the resolution of the $i^{th}$ frame of rendered image to be consistent with the resolution of the virtual display screen using interpolation method.

20. A image generating system, comprising:
   a processor; and
   a memory coupled to the processor and storing computer readable instructions which when executed by the processor, cause the processor to perform the image generating method according to claim 1.

\* \* \* \* \*